United States Patent
Haraguchi et al.

(10) Patent No.: US 8,711,290 B2
(45) Date of Patent: Apr. 29, 2014

(54) PROJECTION-TYPE VIDEO-IMAGE DISPLAY APPARATUS

(75) Inventors: Masahiro Haraguchi, Daito (JP); Masutaka Inoue, Hirakata (JP)

(73) Assignee: Sanyo Electric Co., Ltd., Osaka (JP)

(*) Notice: Subject to any disclaimer, the term of this patent is extended or adjusted under 35 U.S.C. 154(b) by 25 days.

(21) Appl. No.: 13/563,016

(22) Filed: Jul. 31, 2012

(65) Prior Publication Data
US 2013/0033651 A1 Feb. 7, 2013

(30) Foreign Application Priority Data

Aug. 1, 2011 (JP) ................................. 2011-168218

(51) Int. Cl.
*H04N 5/74* (2006.01)

(52) U.S. Cl.
USPC .......................................................... 348/744

(58) Field of Classification Search
USPC ......... 348/744, 756, 745, 805–806, 808, 816; 353/98, 84, 30, 31; 345/690
See application file for complete search history.

(56) References Cited

U.S. PATENT DOCUMENTS

| | | | |
|---|---|---|---|
| 7,733,310 B2 * | 6/2010 | Hajjar et al. ..................... | 345/84 |
| 7,791,561 B2 * | 9/2010 | Hajjar et al. ..................... | 345/32 |
| 7,994,702 B2 * | 8/2011 | Bukesov et al. ............... | 313/498 |
| 8,000,005 B2 * | 8/2011 | Kindler et al. ................. | 359/443 |
| 8,233,217 B2 * | 7/2012 | Kindler et al. ................. | 359/443 |
| 2009/0262308 A1 * | 10/2009 | Ogawa ............................ | 353/31 |
| 2011/0249242 A1 * | 10/2011 | Saitou et al. .................... | 353/98 |

FOREIGN PATENT DOCUMENTS

JP       2010-276757 A       12/2010

* cited by examiner

*Primary Examiner* — Paulos M Natnael

(74) *Attorney, Agent, or Firm* — McDermott Will & Emery LLP

(57) ABSTRACT

A projector includes an excitation light source and a color wheel which is rotatable, with an axis in parallel to an optical axis of the excitation light source serving as a rotation axis. The color wheel includes two phosphors arranged adjacent to each other in a direction of rotation and emitting G light and Ye light respectively as they are excited by excitation light from the excitation light source. The projector further includes a phosphor drive portion which drives the color wheel to rotate such that the two phosphors emit light in a time-division manner within 1 frame period, a video signal analysis portion which analyzes a video signal for each piece of image data in each frame, and an excitation light source drive portion which sets an intensity of excitation light emitted to each phosphor in accordance with a result of analysis by the video signal analysis portion.

5 Claims, 9 Drawing Sheets

PROJECTION-TYPE VIDEO-IMAGE DISPLAY APPARATUS

This nonprovisional application is based on Japanese Patent Application No. 2011-168218 filed on Aug. 1, 2011 with the Japan Patent Office, the entire contents of which are hereby incorporated by reference.

BACKGROUND OF THE INVENTION

1. Field of the Invention

This invention relates to a projection-type video image display apparatus and more particularly to a projection-type video image display apparatus making use of light of a fourth color component in addition to light of a red component, light of a green component, and light of a blue component.

2. Description of the Related Art

For a projection-type video image display apparatus (hereinafter referred to as a projector) aiming to achieve higher luminance, a configuration including three LED (Light Emitting Diode) light sources emitting light of a red component, light of a green component, and light of a blue component as three illumination optical systems for illumination of three liquid crystal panels, respectively, has been studied.

According to the projector above, since each LED light source can emit light in a narrow wavelength band, color purity of light of each color component is high and sharp color reproduction can be achieved.

On the other hand, in order to improve luminance of an image, rather than light of a green component high in color purity, light of a yellow component having a wavelength region adjacent to a wavelength region of this light of a green component and higher in relative luminous efficiency is preferably made use of. Use of light of a yellow component instead of light of a green component, however, leads to such disadvantages as lowering in color purity and resultant restriction of a color reproduction range.

SUMMARY OF THE INVENTION

A projection-type video image display apparatus according to one aspect of this invention includes an excitation light source which emits excitation light and a phosphor. The phosphor includes a plurality of fluorescent portions which emit light of a plurality of colors as they are excited by excitation light from the excitation light source, respectively. The projection-type video image display apparatus further includes a phosphor drive portion which drives the phosphor such that the plurality of fluorescent portions emit light within 1 frame period, a video signal analysis portion which analyzes a video signal for each piece of image data in each frame, and an excitation light source drive portion which sets an intensity of the excitation light emitted to each of the plurality of fluorescent portions in accordance with a result of analysis by the video signal analysis portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
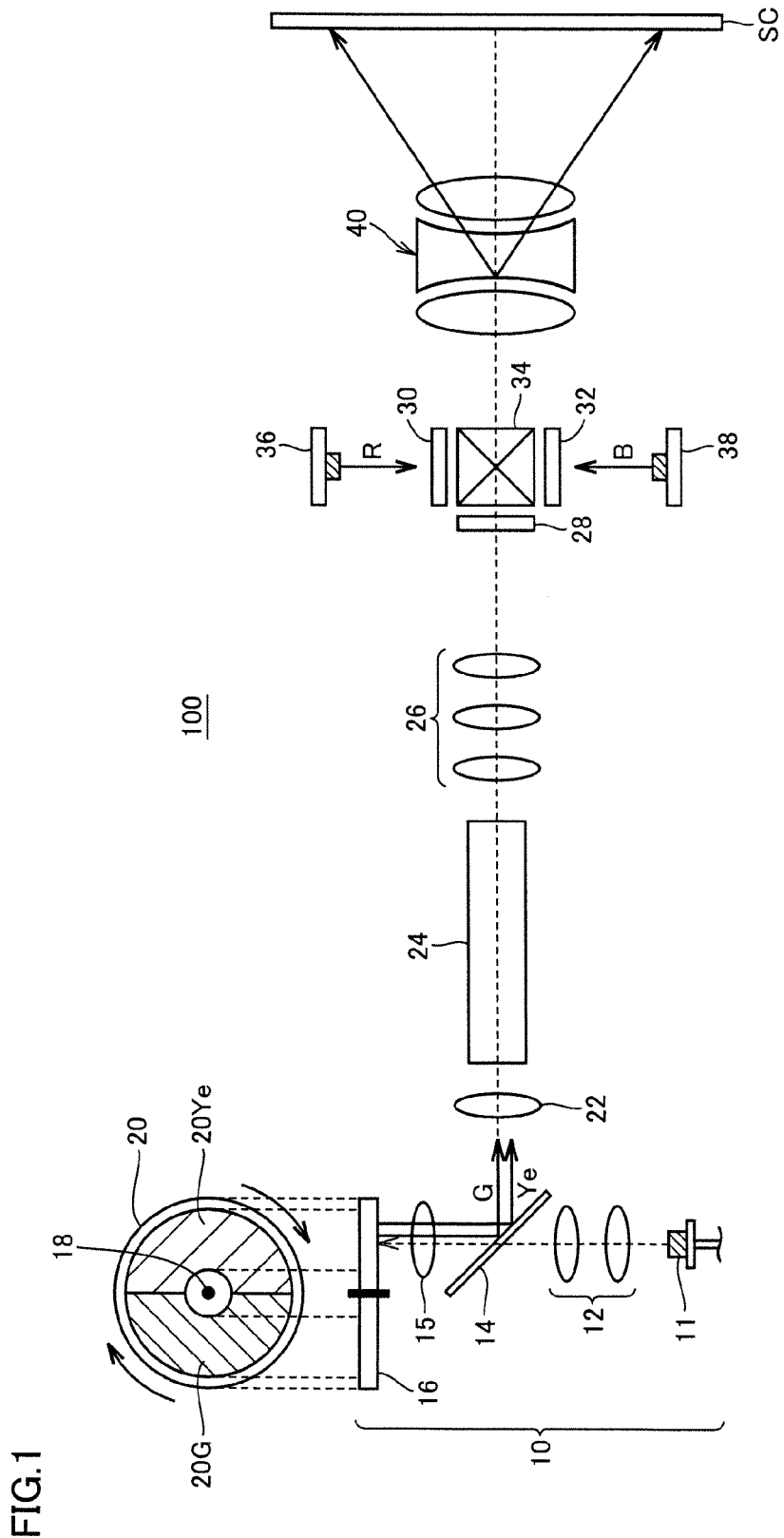
FIG. 1 is a diagram schematically showing a configuration of a main portion of a projector according to an embodiment of this invention.

An embodiment of the present invention will be described hereinafter in detail with reference to the drawings. In the drawings, the same or corresponding elements have the same reference characters allotted and description thereof will not be repeated.

FIG. 1 is a diagram schematically showing a configuration of a main portion of a projector according to an embodiment of this invention.

Referring to FIG. 1, the projector is a liquid crystal projector which projects a video image by making use of a liquid crystal device. The projector includes an optical engine 100 and a projection lens 40. Though the projector also incorporates a component for outputting voice and sound such as a speaker, a component of optical engine 100, a circuit board for electrically connecting audio output means, and the like, some components including the above are not shown in FIG. 1.

Optical engine 100 includes a red LED 36 which emits light in a red wavelength region (hereinafter referred to as "R light"), a blue LED 38 which emits light in a blue wavelength region (hereinafter referred to as "B light"), and a light source apparatus 10 which emits light in a green wavelength region (hereinafter referred to as "G light").

Red LED 36 is composed, for example, of a material of a GaP-based, an AlGaAs color-mixture-based, or the like, and it emits R light. R light from red LED 36 is incident on a liquid crystal panel 30 through a condenser lens and a polarizing plate on an incident side, which are not shown. Liquid crystal panel 30 is driven in response to a video signal for a red color and it modulates R light in accordance with a state of drive thereof. R light modulated by liquid crystal panel 30 is incident on a dichroic prism 34 through a not-shown polarizing plate on an emission side.

Blue LED 38 is composed, for example, of a material of an InGaN-based, a GaN-based, a zinc-oxide-based, or the like, and it emits B light. B light from blue LED 38 is incident on a liquid crystal panel 32 through a condenser lens and a polarizing plate on an incident side, which are not shown. Liquid crystal panel 32 is driven in response to a video signal for a blue color, and it modulates B light in accordance with a state of drive thereof. B light modulated by liquid crystal panel 32 is incident on dichroic prism 34 through a not-shown polarizing plate on an emission side.

Light source apparatus 10 includes a laser light source 11 serving as an excitation light source which emits excitation light for a phosphor, condenser lenses 12, 15, a dichroic mirror 14, and a rotating element 16.

Laser light source 11 emits laser beams including B light as excitation light. Excitation light emitted from laser light source 11 is condensed by condenser lens 12. Excitation light condensed by condenser lens 12 passes through dichroic mirror 14 and it is incident on rotating element 16.

Rotating element 16 includes a rotation axis 18 in parallel to an optical axis of laser light source (excitation light source) 11 and a color wheel 20 rotatable around rotation axis 18.

Rotation axis 18 is connected to a not-shown motor. By driving the motor to rotate, color wheel 20 rotates around rotation axis 18. In the present embodiment, for the sake of brevity, a rotation cycle of rotating element 16 (a time period required for 1 cycle) and a control cycle of excitation light source 11 (an on-off cycle) are both assumed to be equal to a frame cycle (a time period per 1 frame).

Color wheel 20 includes a plurality of phosphors arranged in a manner aligned in a circumferential direction around rotation axis 18. In the present embodiment, color wheel 20 includes a green phosphor (hereinafter also denoted as a "G phosphor") 20G which receives excitation light emitted from excitation light source 11 and emits G light and a yellow phosphor (hereinafter also denoted as a "Ye phosphor") 20Ye which receives excitation light and emits light in a yellow wavelength region (hereinafter referred to as "Ye light"). Though angular ranges of G phosphor 20G and Ye phosphor 20Ye are each set to 180°, a ratio between these angular ranges is not limited to 1:1.

In the configuration above, as rotating element 16 rotates around rotation axis 18, a position of irradiation with excitation light incident on color wheel 20 varies in the order of G phosphor 20G and Ye phosphor 20Ye within 1 frame period. Thus, color wheel 20 emits and radiates G light and Ye light in this order each for ½ frame period. As will be described later, the projector according to the present embodiment differs an intensity of excitation light emitted by excitation light source 11 between a period during which G phosphor 20G emits light and a period during which Ye phosphor 20Ye emits light. Thus, the intensity of G light and the intensity of Ye light emitted by color wheel 20 in a time-division manner can be different from each other.

G light and Ye light emitted from color wheel 20 are incident on dichroic mirror 14 through condenser lens 15. Dichroic mirror 14 allows passage of excitation light emitted from excitation light source 11, whereas it reflects G light and Ye light of which wavelength has been converted from that of the excitation light. G light and Ye light reflected by dichroic mirror 14 are condensed by a condenser lens 22, and thereafter they are incident on one end portion of a rod integrator 24. G light and Ye light propagate through rod integrator 24 and go out of the other end portion of rod integrator 24. Rod integrator 24 has a function as an integrator optical system which converts a luminous flux having non-uniform intensity distribution to a luminous flux having substantially uniform intensity distribution.

A relay optical system 26 includes a lens on an incident side, a relay lens, and a lens on an emission side. A luminous flux emitted from rod integrator 24 is guided to a liquid crystal panel 28 through relay optical system 26 and a not-shown polarizing plate on an incident side. Liquid crystal panel 28 is driven in response to a video signal for a green color and it modulates G light and Ye light in accordance with a state of drive thereof. G light and Ye light modulated by liquid crystal panel 28 are incident on dichroic prism 34 through a not-shown polarizing plate on an emission side.

Dichroic prism 34 carries out color synthesis of R light, G light, B light, and Ye light modulated by liquid crystal panels 30, 28, 32, and causes the resultant light to be incident on projection lens 40. Projection lens 40 includes a group of lenses for forming an image of projected light on a projection plane (screen) SC and an actuator for displacing some of the lenses in a direction of an optical axis so as to adjust a state of zoom and focus of a projected image. Light resulting from color synthesis by dichroic prism 34 is projected on screen SC in a manner enlarged by projection lens 40.

As described above, the projector according to the embodiment of the present invention projects an image by making use of Ye light in addition to R light, G light, and B light. In the present embodiment, Ye light is superimposed on G light and resultant light is incident on liquid crystal panel 28.

Here, relative luminous efficiency tends to have its peak in a wavelength region around 550 nm and tends to lower toward a shorter wavelength (blue) side and a longer wavelength (red) side. Therefore, by making use of Ye light having a wavelength region around 550 nm (550 nm to 580 nm), luminance of a projected image can efficiently be enhanced. It is noted that this wavelength region has a width originating from difference in wavelength region where peak luminance is attained, between light adaptation and dark adaptation.

On the other hand, when Ye light is made use of instead of G light, a color reproduction range is made smaller because Ye light is lower in color purity than G light. Then, in the projector according to the present embodiment, in consideration of good color reproducibility and high luminance, Ye light is made use of as light of a fourth color component other than R light, G light, and B light.

A control structure of the projector according to the embodiment of the present invention will now be described with reference to FIG. 2.

Figure 2:
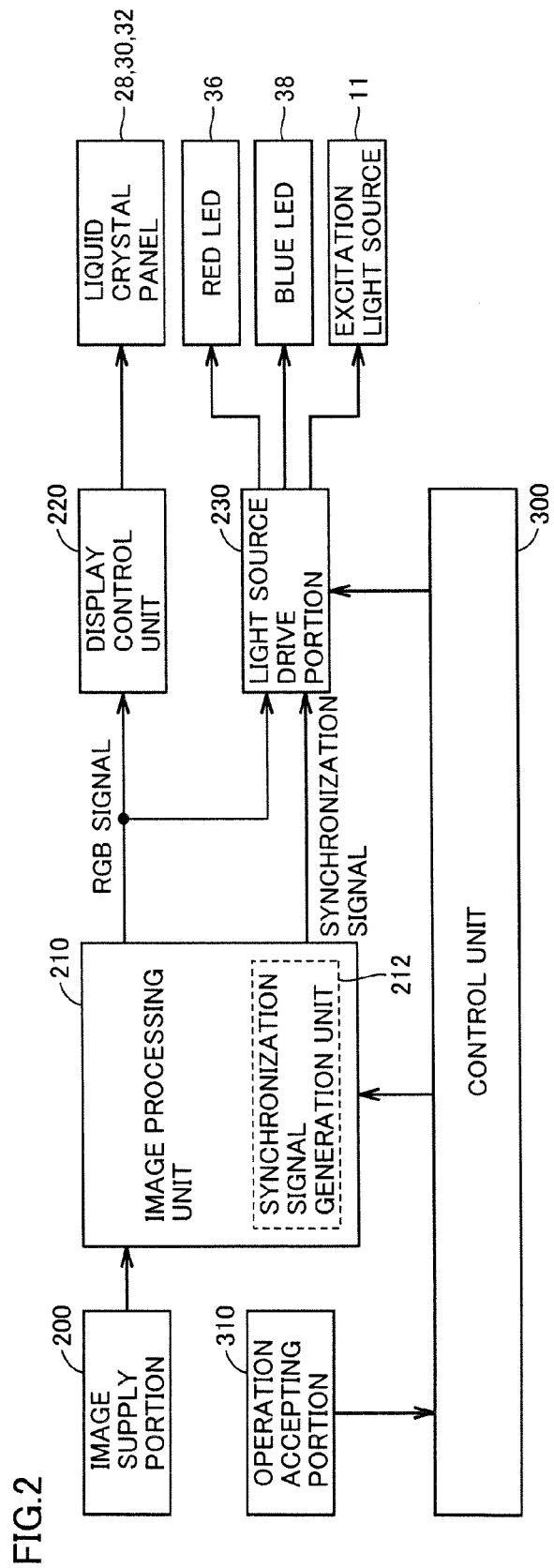
FIG. 2 is a functional block diagram for illustrating a control structure of the projector according to the embodiment of the present invention.

Referring to FIG. 2, the projector includes an image supply portion 200, an image processing unit 210, a display control unit 220, a light source drive portion 230, a control unit 300, and an operation accepting portion 310.

Image supply portion 200 supplies image data to image processing unit 210. Specifically, a cable from an image supply apparatus such as a video image reproduction apparatus is connected to an input terminal (not shown) of image supply portion 200. Image supply portion 200 converts a video signal input to the input terminal into image data in a format processable by image processing unit 210 and outputs the resultant image data to image processing unit 210.

Image processing unit 210 subjects the image data supplied from image supply portion 200 to various image quality adjustment processes such as resolution conversion for adapting resolution to resolution (the number of pixels) of liquid crystal panels 28, 30, 32, luminance adjustment, contrast adjustment, and sharpness adjustment, based on an instruction from control unit 300. Image processing unit 210 outputs an image signal (an RGB signal) to display control unit 220 and light source drive portion 230. It is noted that an image signal output from image processing unit 210 is composed of a plurality of pixel values corresponding to all pixels of liquid crystal panels 28, 30, 32. The pixel value determines light transmissivity of a corresponding pixel.

Image processing unit 210 includes a synchronization signal generation unit 212. Synchronization signal generation unit 212 generates a synchronization signal for synchronizing drive of each monochromatic light source (red LED 36, blue LED 38, light source apparatus 10) and drive of liquid crystal panels 28, 30, 32 with each other. The generated synchronization signal is output to light source drive portion 230.

Display control unit 220 generates a drive signal for controlling an operation for displaying an image by optical engine 100 in accordance with the RGB signal output from image processing unit 210 and outputs the drive signal to optical engine 100. Specifically, display control unit 220 outputs a drive signal to each of liquid crystal panels 28, 30, 32. Each of liquid crystal panels 28, 30, 32 includes a panel in which liquid crystal pixels are arranged in matrix and a panel driver for driving a liquid crystal element of the panel based on the provided drive signal in each of horizontal and vertical directions.

Light source drive portion 230 drives red LED 36, blue LED 38, and excitation light source 11, based on the RGB signal output from image processing unit 210. Specifically, light source drive portion 230 generates a drive signal with pulse width modulation (PWM) based on an R signal included in the RGB signal and outputs the generated drive signal (drive current) to red LED 36. In addition, light source drive portion 230 generates a drive signal based on a B signal included in the RGB signal and outputs the generated drive signal to blue LED 38.

Furthermore, light source drive portion 230 controls an intensity of excitation light emitted from excitation light source 11 based on the RGB signal output from image processing unit 210. Specifically, light source drive portion 230 sets an intensity of excitation light emitted to G phosphor 20G of color wheel 20 (FIG. 1) and an intensity of excitation light emitted to Ye phosphor 20Ye in accordance with the RGB signal for each 1 frame. A method of setting an intensity of excitation light emitted to each phosphor 20G, 20Ye will be described later.

Control unit 300 is mainly configured with a microcomputer including a CPU (Central Processing Unit), such a storage portion as a ROM (Read Only Memory) and a RAM (Random Access memory), and an input/output interface. Control unit 300 provides centralized control of an operation of the projector as the CPU reads a program stored in advance in the ROM or the like to the RAM and executes the program.

Operation accepting portion 310 accepts externally provided information and outputs the information to control unit 300. Externally provided information includes an operation signal in accordance with a user's operation content and the like, which is transmitted from a control panel for giving various user's instructions to the projector or from a remote controller that can remotely be operated.

Figure 3:
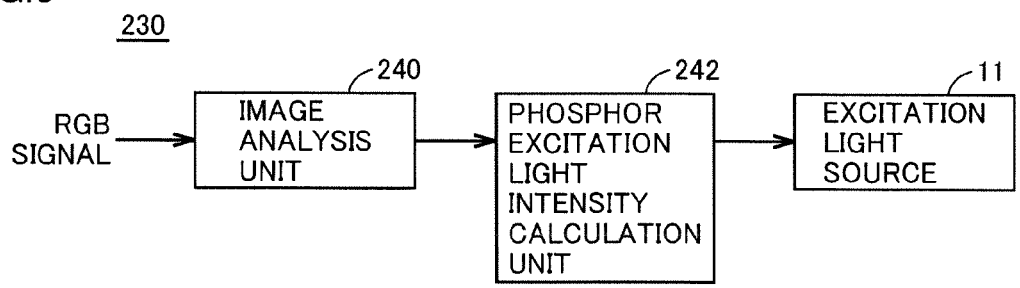
FIG. 3 is a functional block diagram illustrating a configuration of a light source drive portion shown in FIG. 2.

FIG. 3 shows a further detailed configuration of light source drive portion 230 (FIG. 2).

Referring to FIG. 3, light source drive portion 230 controls drive of red LED 36, blue LED 38, and light source apparatus 10 (excitation light source 11) based on an instruction from control unit 300. Specifically, light source drive portion 230 includes an image analysis unit 240 and a phosphor excitation light intensity calculation unit 242.

When image analysis unit 240 receives an image signal (an RGB signal) generated by image processing unit 210 (FIG. 2), image analysis unit 240 analyzes this RGB signal for each piece of image data in each frame to thereby calculate a color reproduction range of the image data.

Specifically, image analysis unit 240 converts the RGB signal forming 1 frame into an HSV signal composed of three components of a hue (H), saturation (S), and a value (V). A hue (a real number not smaller than 0 and smaller than 360) represents a type of a color, saturation (a real number not smaller than 0 and not greater than 1) represents vividness of a color, and a value (a real number not smaller than 0 and not greater than 1) represents brightness of a color.

In addition, image analysis unit 240 converts the RGB signal forming 1 frame into a YUV signal composed of a luminance component (Y), a blue color difference component between the luminance component and a blue component (U), and a red color difference component between the luminance component and a red component (V). When image analysis unit 240 converts the RGB signal into the HSV signal and the YUV signal, image analysis unit 240 calculates for each pixel, saturation and luminance of a 1-frame image reproduced by the RGB signal, based on the HSV signal and the YUV signal.

Phosphor excitation light intensity calculation unit 242 calculates an intensity of excitation light emitted to Ye phosphor 20Ye within 1 frame period based on saturation and luminance calculated by image analysis unit 240. In addition, phosphor excitation light intensity calculation unit 242 calculates an intensity of excitation light emitted to G phosphor 20G based on the calculated intensity of excitation light emitted to Ye phosphor 20Ye. In the description below, an intensity of excitation light emitted to Ye phosphor 20Ye is also denoted as a "Ye phosphor excitation light intensity," and an intensity of excitation light emitted to G phosphor 20G is also denoted as a "G phosphor excitation light intensity."

An intensity of light emission from excitation light source 11 is controlled for each 1 frame period, in accordance with a Ye phosphor excitation light intensity and a G phosphor excitation light intensity calculated by phosphor excitation light intensity calculation unit 242.

(Setting of Phosphor Excitation Light Intensity)

Figure 4:
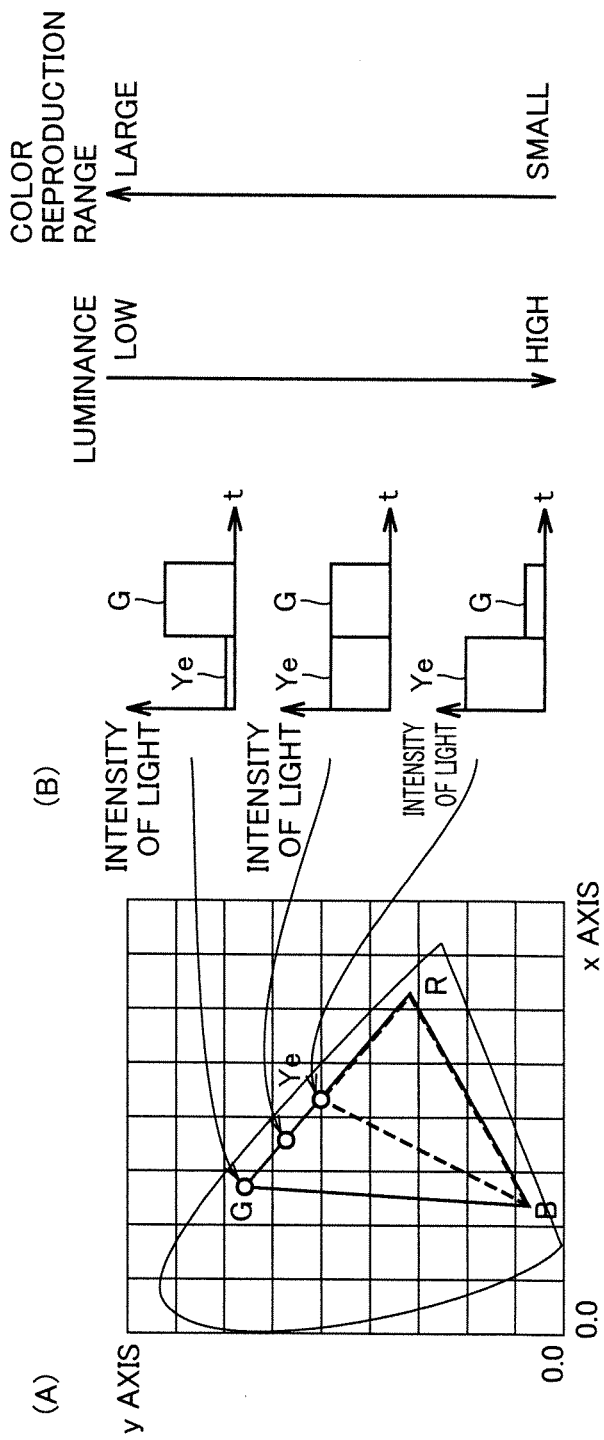
FIGS. 4(A) and 4(B) are conceptual views for illustrating setting of a phosphor excitation light intensity for a color reproduction range of an image.

A method of setting a phosphor excitation light intensity according to the embodiment of the present invention will be described hereinafter with reference to FIG. 4.

FIGS. 4(A) and 4(B) are conceptual views for illustrating setting of a phosphor excitation light intensity for a color reproduction range of an image.

FIG. 4(A) is a chromaticity diagram expressing a color of each pixel in two axes (an x axis and a y axis). FIG. 4(B) shows a G phosphor excitation light intensity and a Ye phosphor excitation light intensity set in correspondence with a color reproduction range shown in the chromaticity diagram in FIG. 4(A).

A range surrounded with a solid line in FIG. 4(A) is a color reproduction range in the case where an image of which high color reproducibility is required is input. A range surrounded by a dashed line is a color reproduction range in the case where an image of which high luminance is required is input. The color reproduction range in the case where high luminance is required is smaller than the color reproduction range in the case where high color reproducibility is required. Namely, as higher luminance is required, a color reproduction range becomes smaller.

In the present embodiment, when the color reproduction range of an image is maximum, an intensity of superimposed Ye light is set to a minimum value. On the other hand, when the color reproduction range of an image is minimum, an intensity of superimposed Ye light is set to a maximum value. Namely, an intensity of superimposed Ye light is changed depending on a color reproduction range of an image. According to such a configuration, a color reproduction range at the time when an intensity of superimposed Ye light is maximum is smaller than a color reproduction range at the time when an intensity of superimposed Ye light is minimum. Namely, with decrease in color reproduction range, an intensity of superimposed Ye light increases. In the present embodiment, since Ye light is superimposed on G light, a color reproduction range is made smaller in a hue of green (G).

Specifically, phosphor excitation light intensity calculation unit 242 changes an intensity of superimposed Ye light by changing a Ye phosphor excitation light intensity in accordance with a color reproduction range of an image (a frame) as shown in FIG. 4(B). In FIG. 4(B), with increase in Ye phosphor excitation light intensity, an intensity of superimposed Ye light increases. Namely, an intensity of superimposed Ye light is maximized when the Ye phosphor excitation light intensity is maximum, and an intensity of superimposed Ye light is minimized when the Ye phosphor excitation light intensity is minimum.

Furthermore, phosphor excitation light intensity calculation unit 242 decreases a G phosphor excitation light intensity with increase in Ye phosphor excitation light intensity. Specifically, phosphor excitation light intensity calculation unit 242 maximizes the G phosphor excitation light intensity when the Ye phosphor excitation light intensity is minimum, whereas it minimizes the G phosphor excitation light intensity when the Ye phosphor excitation light intensity is maximum.

Here, phosphor excitation light intensity calculation unit 242 sets a G phosphor excitation light intensity and a Ye phosphor excitation light intensity such that a total of the G phosphor excitation light intensity and the Ye phosphor excitation light intensity does not exceed an intensity of excitation light that excitation light source 11 is allowed to emit (hereinafter also referred to as an "allowable intensity of light"). It is noted that the "allowable intensity of light" corresponds to such a limit value of an intensity of light according to the specifications that, if excitation light in an intensity more than the allowable intensity of light is emitted from excitation light source 11, cooling performance of excitation light source 11 cannot be maintained and deterioration of excitation light source 11 may quickly proceed. Therefore, phosphor excitation light intensity calculation unit 242 can suppress deterioration of excitation light source 11 by setting a G phosphor excitation light intensity and a Ye phosphor excitation light intensity such that the total thereof does not exceed the allowable intensity of light.

By thus changing a Ye phosphor excitation light intensity and a G phosphor excitation light intensity in accordance with a color reproduction range of an image, in the case where a color reproduction range of an image is small, a Ye phosphor excitation light intensity is increased (that is, an intensity of superimposed Ye light is increased). Then, luminance of a projected image can be enhanced. On the other hand, in the case where a color reproduction range of an image is large, a G phosphor excitation light intensity is increased (that is, a Ye phosphor excitation light intensity (an intensity of superimposed Ye light) is decreased). Then, color reproducibility of a projected image can be ensured. Consequently, higher luminance and higher color reproducibility adapted to an image can both be realized.

A method of setting of a Ye phosphor excitation light intensity and a G phosphor excitation light intensity by phosphor excitation light intensity calculation unit 242 will be described hereinafter in detail.

As shown in FIG. 3, phosphor excitation light intensity calculation unit 242 calculates a Ye phosphor excitation light intensity for each 1 frame period, based on saturation and luminance calculated by image analysis unit 240. Specifically, phosphor excitation light intensity calculation unit 242 specifies for each pixel, a Ye phosphor excitation coefficient for calculated saturation and a Ye phosphor excitation coefficient for calculated luminance. The "Ye phosphor excitation coefficient" is a coefficient for controlling a Ye phosphor excitation light intensity such that the total of the Ye phosphor excitation light intensity and the G phosphor excitation light intensity does not exceed the allowable intensity of light of excitation light source 11. The Ye phosphor excitation coefficient is set within a range from 0 to 1. The Ye phosphor excitation coefficient is specified by a method different for each hue expressed in a pixel.

Figure 5:
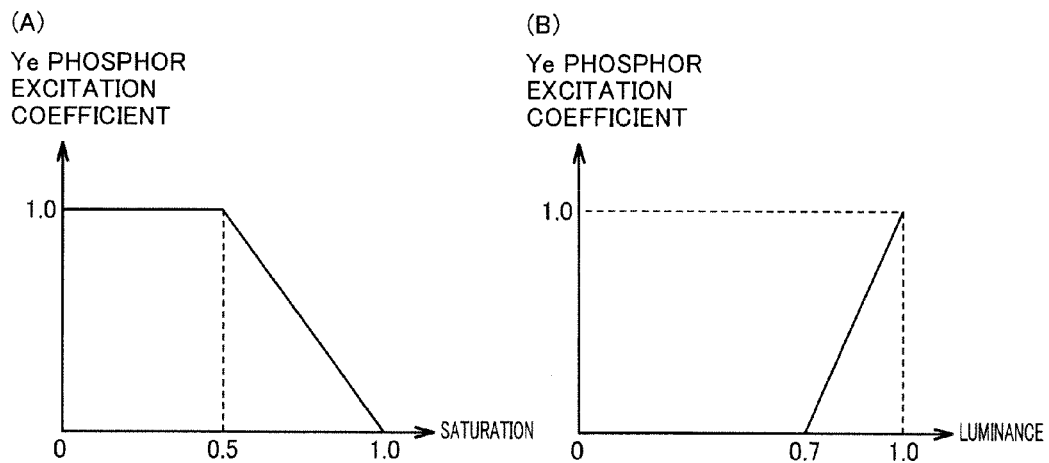
FIGS. 5(A) and 5(B) and FIGS. 6(A) and 6(B) are diagrams showing relation of saturation and luminance with a Ye phosphor excitation coefficient.

A case where a hue expressed in a pixel is G (120) will be described with reference to FIGS. 5(A) and 5(B). FIG. 5(A) is a diagram showing relation of saturation with a Ye phosphor excitation coefficient. As shown in FIG. 5(A), when saturation is low, a Ye phosphor excitation coefficient is set to be great, whereas when saturation is high, a Ye phosphor excitation coefficient is set to be small. In particular when saturation is not lower than a prescribed value (0.5), a Ye phosphor excitation coefficient is set to be smaller as saturation is higher. By thus setting a Ye phosphor excitation coefficient in accordance with saturation, when saturation is low, higher luminance can be realized by increasing a Ye phosphor excitation light intensity, that is, by increasing an intensity of superimposed Ye light.

FIG. 5(B) is a diagram showing relation of luminance with a Ye phosphor excitation coefficient. As shown in FIG. 5(B), when luminance is low, a Ye phosphor excitation coefficient is set to be small, whereas when luminance is high, a Ye phosphor excitation coefficient is set to be great. In particular when luminance is not higher than a prescribed value (0.7), a Ye phosphor excitation coefficient is set to zero. By thus setting a Ye phosphor excitation coefficient in accordance with luminance, when luminance is low, high color reproducibility can be realized by decreasing a Ye phosphor excitation light intensity, that is, by increasing a G phosphor excitation light intensity.

Figure 6:
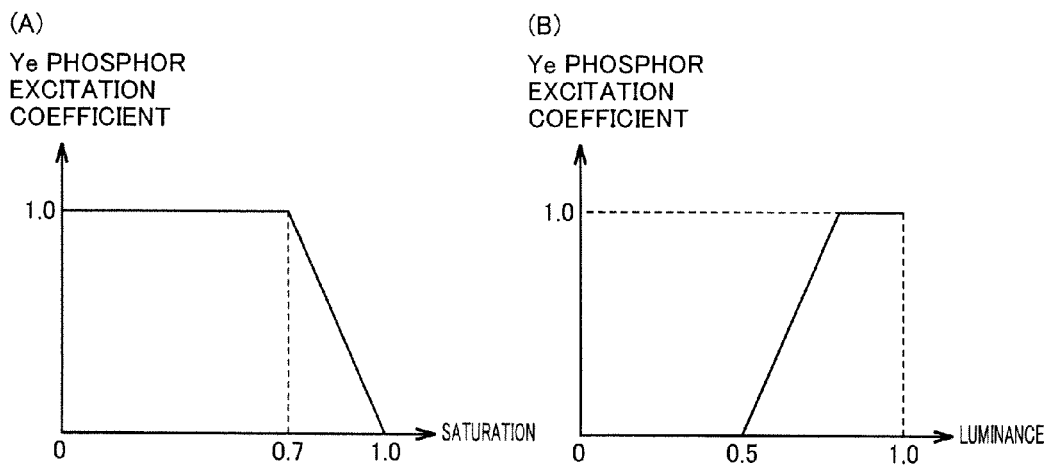

In addition, a case where a hue expressed in a pixel is Cy (cyan; 180) will be described with reference to FIGS. 6(A) and 6(B). FIG. 6(A) is a diagram showing relation of saturation with a Ye phosphor excitation coefficient. As shown in FIG. 6(A), when saturation is low, a Ye phosphor excitation coefficient is set to be great, whereas when saturation is high, a Ye phosphor excitation coefficient is set to be small. In particular in the case where saturation is not lower than prescribed value (0.7), as saturation is higher, a Ye phosphor excitation coefficient is set to be small.

FIG. 6(B) is a diagram showing relation of luminance with a Ye phosphor excitation coefficient. As shown in FIG. 6(B), when luminance is low, a Ye phosphor excitation coefficient is set to be small, whereas when luminance is high, a Ye phosphor excitation coefficient is set to be great. In particular when luminance is not higher than a prescribed value (0.5), a Ye phosphor excitation coefficient is set to zero.

It is noted that, based on comparison between FIGS. 5(A) and 6(A), saturation at which a Ye phosphor excitation coefficient starts to lower is higher in the case where a hue is Cy than in the case where a hue is G. In addition, based on comparison between FIGS. 5(B) and 6(B), luminance at which a Ye phosphor excitation coefficient starts to increase is lower in the case where a hue is Cy than in the case where a hue is G. This is because, when the hue is Cy, superimposition of Ye light affects a color reproduction range less than when the hue is G. In other words, influence on a color reproduction range is less when the hue is Cy. Therefore, as compared with the case where the hue is G, a Ye phosphor excitation coefficient is maintained at a high value until higher saturation is attained, and luminance is improved from lower luminance by increasing a Ye phosphor excitation coefficient.

Phosphor excitation light intensity calculation unit 242 has relation between saturation and a Ye phosphor excitation coefficient and relation between luminance and a Ye phosphor excitation coefficient in advance as shown in FIGS. 5(A) and 5(B) and FIGS. 6(A) and (B), for each hue expressed in a pixel. Then, phosphor excitation light intensity calculation unit 242 specifies a Ye phosphor excitation coefficient corresponding to calculated saturation and a Ye phosphor excitation coefficient corresponding to luminance for each pixel, by referring to these relations determined for each hue.

Then, phosphor excitation light intensity calculation unit 242 calculates a final Ye phosphor excitation coefficient in a pixel by multiplying a Ye phosphor excitation coefficient corresponding to saturation by a Ye phosphor excitation coefficient corresponding to luminance. Then, phosphor excitation light intensity calculation unit 242 specifies a minimum value of the Ye phosphor excitation coefficient calculated for each pixel as the Ye phosphor excitation coefficient corresponding to an image (1 frame). Then, phosphor excitation light intensity calculation unit 242 calculates a Ye phosphor excitation light intensity corresponding to the image by multiplying the allowable intensity of light which is a maximum value that can be taken by the Ye phosphor excitation light intensity by a Ye phosphor excitation coefficient corresponding to the image above.

Though a configuration in the present embodiment has been such that a minimum value of a Ye phosphor excitation coefficient specified for each pixel is specified as a Ye phosphor excitation coefficient for an image, an average value of Ye phosphor excitation coefficients specified for pixels may be specified as a Ye phosphor excitation coefficient of an image.

When the Ye phosphor excitation light intensity is calculated, phosphor excitation light intensity calculation unit 242 calculates a G phosphor excitation light intensity by subtracting the Ye phosphor excitation light intensity from the allowable intensity of light. Thus, the Ye phosphor excitation light intensity and the G phosphor excitation light intensity are calculated for each frame.

When phosphor excitation light intensity calculation unit 242 sets the Ye phosphor excitation light intensity and the G phosphor excitation light intensity with the method described above, it controls drive of excitation light source 11 such that Ye phosphor 20Ye is irradiated with excitation light in the set Ye phosphor excitation light intensity within a ½ frame period and G phosphor 20G is irradiated with excitation light in the set G phosphor excitation light intensity within a ½ frame period.

Figure 7:
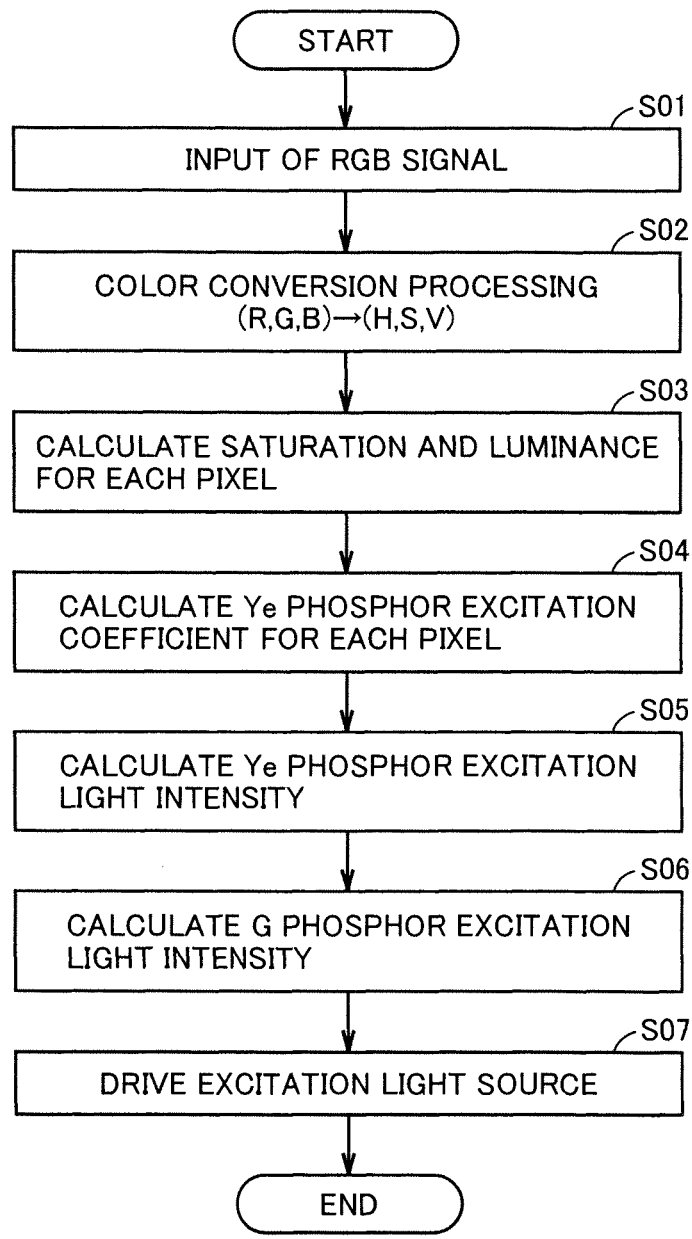
FIG. 7 is a flowchart showing a processing procedure for controlling the light source drive portion according to the embodiment of this invention.

FIG. 7 is a flowchart showing a processing procedure for controlling the light source drive portion according to the embodiment of this invention. Processing in each step shown in FIG. 7 is realized as light source drive portion 230 functions as each control block shown in FIG. 3.

Referring to FIG. 7, when an RGB signal forming 1 frame is input in step S01, light source drive portion 230 converts this RGB signal into an HSV signal in step S02. In addition, light source drive portion 230 converts this RGB signal into a YUV signal. In step S03, light source drive portion 230 calculates for each pixel, saturation and luminance of a 1-frame image reproduced by the RGB signal based on the resultant HSV signal and YUV signal. Namely, processing in steps S02, S03 corresponds to the function of image analysis unit 240 shown in FIG. 3.

In step S04, light source drive portion 230 calculates for each pixel, a Ye phosphor excitation coefficient by referring to relation of saturation and luminance predetermined for each hue with a Ye phosphor excitation coefficient (for example, FIGS. 5(A) and 5(B) and FIGS. 6(A) and 6(B)), based on saturation and luminance calculated in step S03.

Then, when light source drive portion 230 specifies a minimum value (or an average value) of the Ye phosphor excitation coefficient calculated for each pixel as the Ye phosphor excitation coefficient corresponding to an image, it calculates in step S05 a Ye phosphor excitation light intensity by multiplying the allowable intensity of light by this specified Ye phosphor excitation coefficient. In addition, light source drive portion 230 calculates in step S06 a G phosphor excitation light intensity by subtracting the Ye phosphor excitation light intensity calculated in step S05 from the allowable intensity of light.

In step S07, light source drive portion 230 controls drive of excitation light source 11 such that Ye phosphor 20Ye and G phosphor 20G are irradiated with excitation light in the Ye phosphor excitation light intensity and the G phosphor excitation light intensity calculated in steps S05 and S06, respectively. Namely, processing in steps S04 to S07 corresponds to the function of phosphor excitation light intensity calculation unit 242 shown in FIG. 3.

Thus, according to the projector in the embodiment of the present invention, in such a configuration that G light and Ye light are emitted in a time-division manner by irradiation of G phosphor 20G and Ye phosphor 20Ye with excitation light in a time-division manner, higher luminance and higher color reproducibility adapted to a projected image can both be realized by changing a Ye phosphor excitation light intensity and a G phosphor excitation light intensity in accordance with a color reproduction range of an image.

[First Variation]

In the embodiment described above, such a configuration that a Ye phosphor excitation light intensity and a G phosphor excitation light intensity are set such that the total thereof does not exceed an allowable intensity of light of excitation light source 11 has been described, however, the present invention is applicable also to a projector configured such that an intensity of light emission from each monochromatic light source can be adjusted in accordance with brightness of an input video signal.

Figure 8:
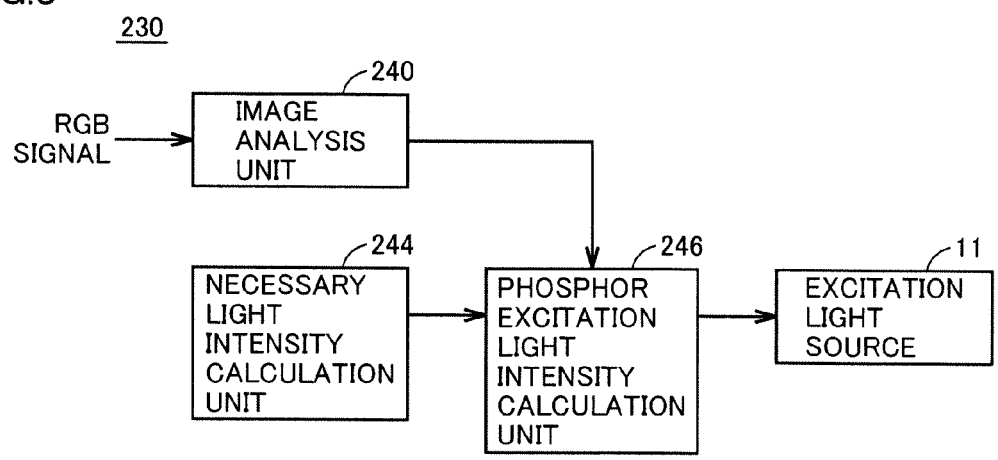
FIG. 8 is a functional block diagram for illustrating a configuration of a light source drive portion in the projector according to a variation of the embodiment of the present invention.

FIG. 8 is a functional block diagram showing a configuration of light source drive portion 230 in the projector according to the first variation of the embodiment of this invention.

Referring to FIG. 8, light source drive portion 230 according to the present variation further includes a necessary light intensity calculation unit 244 as compared with light source drive portion 230 shown in FIG. 3.

Necessary light intensity calculation unit 244 calculates an intensity of light emission of each monochromatic light source (red LED 36, blue LED 38, and light source apparatus 10) necessary for projecting an image (1 frame) (hereinafter referred to as a "necessary light intensity") based on an RGB signal input from image analysis unit 240. For example, when image data having 8 bits per 1 pixel is assumed as an RGB signal, the RGB signal represents 256 levels of gray, and its minimum value is "0" and its maximum value is "255". Necessary light intensity calculation unit 244 calculates a necessary light intensity of each monochromatic light source based on a maximum value (hereinafter referred to as a "maximum signal value") among a signal value for each pixel of an R signal, a signal value for each pixel of a G signal, and a signal value for each pixel of a B signal. For example, in the case where a maximum signal value is "255" which is the maximum value, a necessary light intensity of each monochromatic light source is set to the maximum.

Though the configuration in the present first variation is such that a necessary light intensity of each monochromatic light source is calculated based on a maximum signal value of an RGB signal, the configuration may be such that a necessary light intensity of each monochromatic light source is calculated based on an average value of signal values for pixels of an RGB signal.

Phosphor excitation light intensity calculation unit 242 sets a Ye phosphor excitation light intensity and a G phosphor excitation light intensity in accordance with a color reproduction range of an image (1 frame) based on this RGB signal. When phosphor excitation light intensity calculation unit 242 specifies a Ye phosphor excitation coefficient corresponding to an image in accordance with saturation and luminance for each pixel forming an image with the method described in the previous embodiment, it calculates a Ye phosphor excitation light intensity corresponding to the image by multiplying the allowable intensity of light of excitation light source 11 by the Ye phosphor excitation coefficient corresponding to the image. In addition, phosphor excitation light intensity calculation unit 242 calculates a G phosphor excitation light intensity by subtracting the Ye phosphor excitation light intensity from the allowable intensity of light.

In the projector according to the present first variation, phosphor excitation light intensity calculation unit 242 corrects a G phosphor excitation light intensity in accordance with a result of comparison between the intensity of light necessary for excitation light source 11 to excite phosphors 20Ye, 20G (the necessary light intensity) and an allowable intensity of light that excitation light source 11 is allowed to emit.

Specifically, when the necessary light intensity is smaller than the allowable intensity of light, phosphor excitation light intensity calculation unit 242 decreases an intensity of excitation light emitted from excitation light source 11 by decreasing a G phosphor excitation light intensity, with the necessary light intensity being defined as the lower limit. Namely, the G phosphor excitation light intensity is decreased by an intensity of light corresponding to a difference between the necessary light intensity and the allowable intensity of light.

Thus, in the projector according to the present first variation, when the necessary light intensity is smaller than the allowable intensity of light, correction for decreasing a G phosphor excitation light intensity is made. Thus, power consumption in light source apparatus 10 as a whole can be reduced while luminance realized by superimposition of Ye light is kept.

Figure 9:
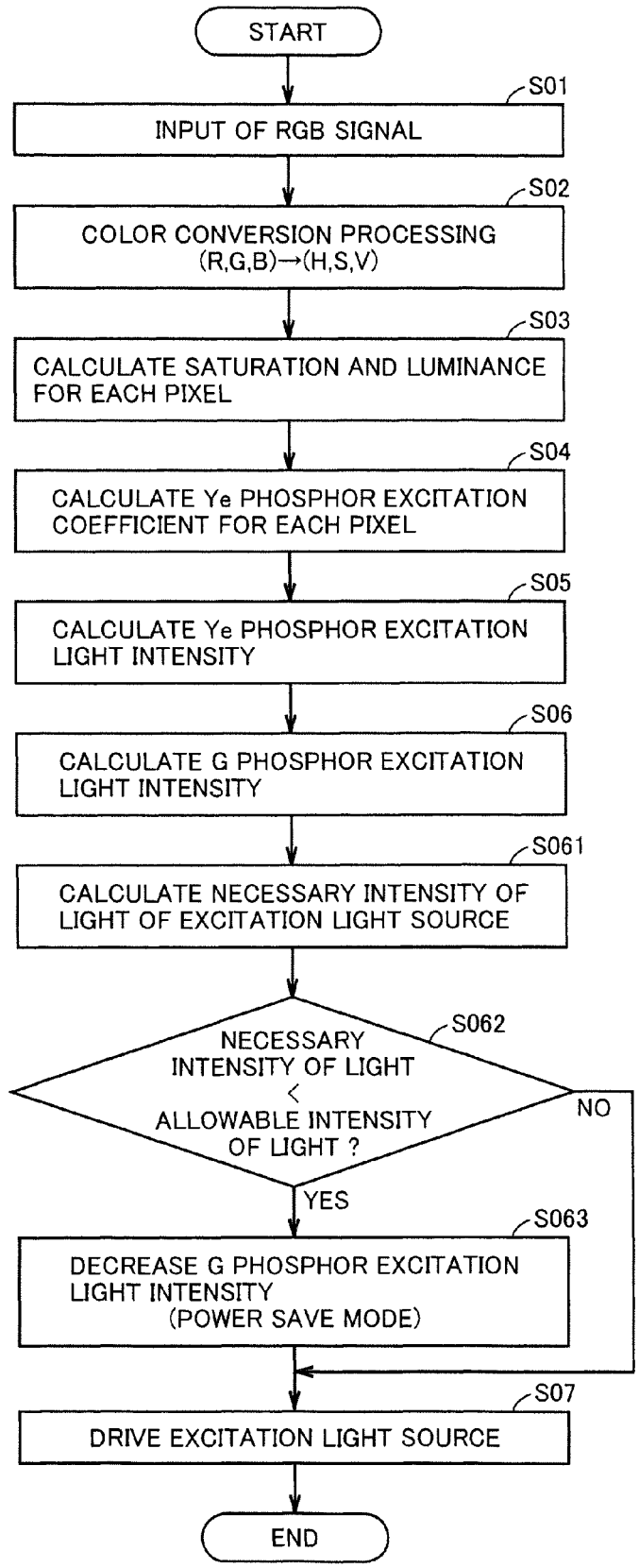
FIG. 9 is a flowchart showing a processing procedure for light source drive control according to a first variation of the embodiment of this invention.

FIG. 9 is a flowchart showing a processing procedure for controlling light source drive portion 230 according to the first variation of the embodiment of this invention. Processing in each step shown in FIG. 9 is realized as light source drive portion 230 functions as each control block shown in FIG. 8.

Referring to FIG. 9, light source drive portion 230 sets a Ye phosphor excitation light intensity and a G phosphor excitation light intensity in accordance with a color reproduction range of an image, through steps S01 to S06 the same as in FIG. 7. Then, in step S061, light source drive portion 230 calculates a necessary light intensity of each monochromatic light source based on an RGB signal. In step S062, light source drive portion 230 compares the calculated necessary light intensity of excitation light source 11 with the allowable intensity of light. When the necessary light intensity is smaller than the allowable intensity of light (YES in step S062), light source drive portion 230 decreases the G phosphor excitation light intensity in step S063 by subtracting the intensity of light corresponding to a difference between the necessary light intensity and the allowable intensity of light from the G phosphor excitation light intensity.

On the other hand, when the necessary light intensity is not smaller than the allowable intensity of light (NO in step S062), light source drive portion 230 does not correct the G phosphor excitation light intensity as described above.

In step S07, light source drive portion 230 controls drive of excitation light source 11 such that Ye phosphor 20Ye and G phosphor 20G are irradiated with excitation light in the Ye phosphor excitation light intensity and the G phosphor excitation light intensity calculated in steps S05, S06, and S063.

[Second Variation]

In the projector according to the first variation described above, when a necessary light intensity of excitation light source 11 calculated based on an RGB signal is smaller than the allowable intensity of light of excitation light source 11, a G phosphor excitation light intensity is decreased to thereby reduce power consumption in light source apparatus 10 while luminance of an image is kept. With regard to a projector according to a second variation, such a configuration as being able to realizing further higher luminance will be described.

In the present second variation, when a necessary light intensity of excitation light source 11 is smaller than the allowable intensity of light, phosphor excitation light intensity calculation unit 242 (FIG. 8) increases an intensity of excitation light emitted from excitation light source 11 by increasing a Ye phosphor excitation light intensity, with the allowable intensity of light being defined as the upper limit. Namely, a Ye phosphor excitation light intensity is increased by an intensity of light corresponding to a difference between the necessary light intensity and the allowable intensity of light.

Thus, in the projector according to the present second variation, when the necessary light intensity is smaller than the allowable intensity of light, correction for increasing a Ye phosphor excitation light intensity is made. Thus, luminance can further be improved while deterioration of excitation light source 11 is suppressed.

Figure 10:
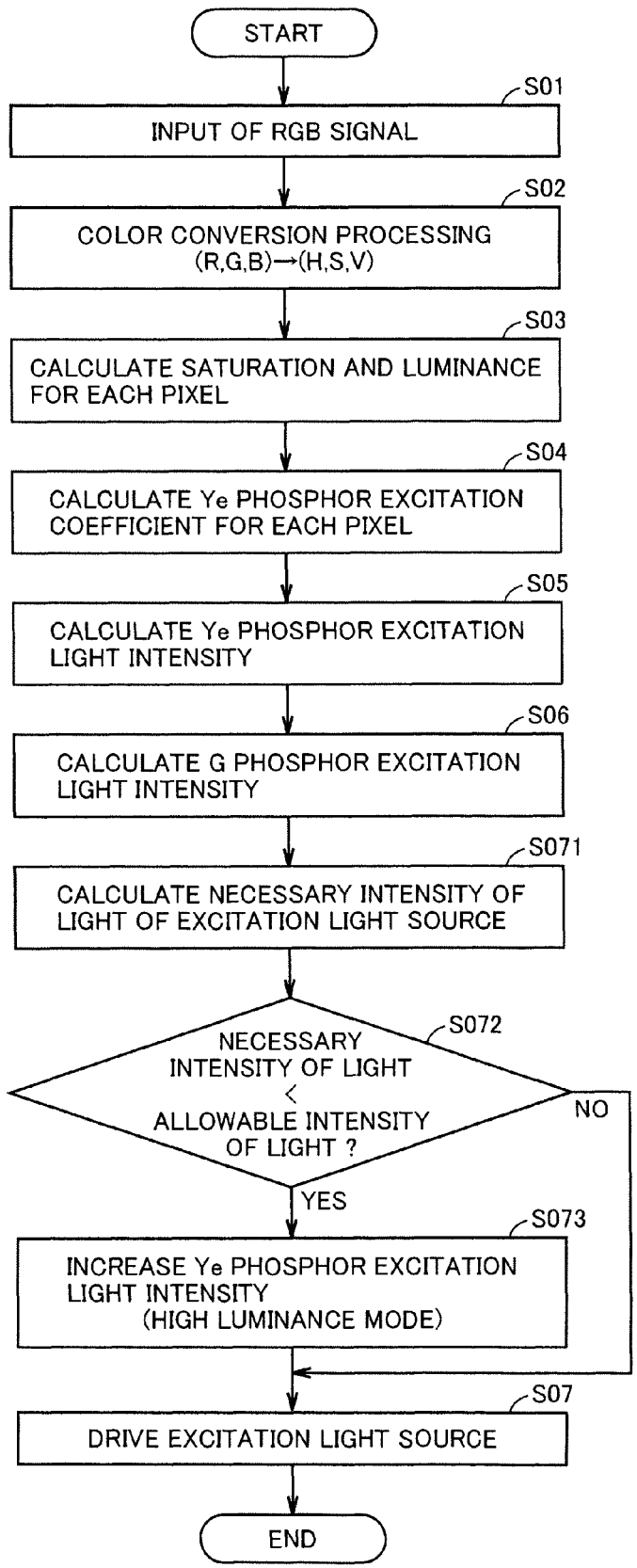
FIG. 10 is a flowchart showing a processing procedure for controlling the light source drive portion according to a second variation of the embodiment of this invention.

FIG. 10 is a flowchart showing a processing procedure for controlling light source drive portion 230 according to the second variation of the embodiment of this invention. Processing in each step shown in FIG. 10 is realized as light source drive portion 230 functions as each control block shown in FIG. 8.

Referring to FIG. 10, light source drive portion 230 sets the Ye phosphor excitation light intensity and the G phosphor excitation light intensity in accordance with a color reproduction range of an image through steps S01 to S06 the same as in FIG. 7. Then, in step S071, light source drive portion 230 calculates a necessary light intensity of each monochromatic light source based on an RGB signal. In step S072, light source drive portion 230 compares the calculated necessary light intensity of excitation light source 11 with the allowable intensity of light. When the necessary light intensity is smaller than the allowable intensity of light (YES in step S072), light source drive portion 230 increases the Ye phosphor excitation light intensity in step S073 by adding the intensity of light corresponding to a difference between the necessary light intensity and the allowable intensity of light to the Ye phosphor excitation light intensity.

On the other hand, when the necessary light intensity is not smaller than the allowable intensity of light (NO in step S072), light source drive portion 230 does not correct the Ye phosphor excitation light intensity as described above.

In step S07, light source drive portion 230 controls drive of excitation light source 11 such that Ye phosphor 20Ye and G phosphor 20G are irradiated with excitation light in the Ye phosphor excitation light intensity and the G phosphor excitation light intensity calculated in steps S05, S06, and S073.

It is noted that, with regard to control of a phosphor excitation light intensity described in the present first and second variations, a control mode placing importance on reduction in power consumption by decreasing a G phosphor excitation light intensity as in the present first variation is referred to as a "power save mode," whereas a control mode placing importance of further higher luminance by increasing a Ye phosphor excitation light intensity as in the present second variation is referred to as a "high luminance mode." The projectors according to the present first and second variations may be configured to be able to select and execute any of the "power save mode" and the "high luminance mode". For example, a user can select any of these modes by performing a prescribed operation.

In the embodiment and the variations thereof described above, such a configuration that Ye light representing light of a fourth color component other than R light, G light, and B light is superimposed on G light has been exemplified, however, the configuration is not limited thereto. Ye light may be superimposed on R light.

Furthermore, in the embodiment and the variations thereof described above, a case where Ye light is made use of as light of a fourth color component has been explained, however, the case is not limited thereto. For example, light of a fourth color component may be light of a magenta component or light of a cyan component. It is noted that colored light superimposed on light of the magenta component is preferably G light or B light. Meanwhile, colored light superimposed on light of the cyan component is preferably R light or B light.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A projection-type video image display apparatus, comprising:
    an excitation light source which emits excitation light; and
    a phosphor, said phosphor including a plurality of fluorescent portions which emit light of a plurality of colors as they are excited by excitation light from said excitation light source, respectively;
    a phosphor drive portion which drives said phosphor such that said plurality of fluorescent portions emit light within 1 frame period;
    a video signal analysis portion which analyzes a video signal for each piece of image data in each frame; and
    an excitation light source drive portion which sets an intensity of the excitation light emitted to each of said plurality of fluorescent portions in accordance with a result of analysis by said video signal analysis portion, wherein
    said plurality of fluorescent portions include
        a first fluorescent portion which emits colored light having a first wavelength, and
        a second fluorescent portion which emits colored light having a second wavelength, which is higher in luminous efficiency than said colored light having the first wavelength and selected to provide an effect to make smaller a color reproduction range to an image, and
    said excitation light source drive portion sets a first intensity of excitation light emitted to said first fluorescent portion and a second intensity of excitation light emitted to said second fluorescent portion in accordance with the result of analysis by said video signal analysis portion.

2. The projection-type video image display apparatus according to claim 1, wherein said excitation light source drive portion sets said second intensity of light in accordance with the color reproduction range of said image data and sets said first intensity of light in accordance with set said second intensity of light such that a total of said first intensity of light and said second intensity of light does not exceed an allowable intensity of light.

3. The projection-type video image display apparatus according to claim 1, wherein said excitation light source drive portion includes
    a necessary light intensity calculation unit which calculates an intensity of excitation light necessary for exciting said phosphor based on said image data, and
    a light intensity correction portion which decreases, when the necessary light intensity calculated by said necessary light intensity calculation unit is lower than the allowable intensity of light, an intensity of excitation light by decreasing said first intensity of light, with said necessary intensity of light being defined as a lower limit.

4. The projection-type video image display apparatus according to claim 1, wherein said excitation light source drive portion includes
    a necessary light intensity calculation unit which calculates an intensity of excitation light necessary for exciting said phosphor based on said image data, and
    a light intensity correction portion which increases, when the necessary light intensity calculated by said necessary light intensity calculation unit is lower than the allowable intensity of light, an intensity of excitation light by increasing said second intensity of light, with said allowable intensity of light being defined as an upper limit.

5. The projection-type video image display apparatus according to claim 1, wherein
    said video signal analysis portion calculates saturation and luminance for each pixel of a 1-frame image reproduced with said image data, and
    said excitation light source drive portion sets an intensity of excitation light emitted to each of said plurality of fluorescent portions within 1 frame period in accordance with saturation and luminance for each pixel calculated by said video signal analysis portion.

* * * * *